(12) United States Patent
Paul

(10) Patent No.: US 8,754,864 B2
(45) Date of Patent: Jun. 17, 2014

(54) TOUCH-SCREEN KEYBOARD FACILITATING TOUCH TYPING WITH MINIMAL FINGER MOVEMENT

(75) Inventor: Sean Paul, Elora (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,257

(22) Filed: Sep. 26, 2011

(65) Prior Publication Data
US 2013/0027434 A1 Jan. 31, 2013

Related U.S. Application Data

(63) Continuation of application No. 13/177,234, filed on Jul. 6, 2011.

(51) Int. Cl.
*G06F 3/041* (2006.01)

(52) U.S. Cl.
USPC .......................................... 345/173

(58) Field of Classification Search
USPC ..................... 345/156–175; 178/18.01–18.11
See application file for complete search history.

(56) References Cited

U.S. PATENT DOCUMENTS

| | | | |
|---|---|---|---|
| 4,587,630 A | 5/1986 | Straton et al. | |
| 5,574,482 A | 11/1996 | Niemeier | |
| 5,581,243 A | 12/1996 | Ouellette et al. | |
| 5,790,104 A | 8/1998 | Shieh | |
| 5,805,157 A | 9/1998 | Bertram et al. | |
| 6,002,390 A * | 12/1999 | Masui | 345/173 |
| 6,144,378 A * | 11/2000 | Lee | 715/767 |
| 6,181,328 B1 | 1/2001 | Shieh et al. | |
| 6,271,835 B1 | 8/2001 | Hoeksma | |
| 6,320,942 B1 * | 11/2001 | Chang | 379/93.27 |
| 6,323,846 B1 | 11/2001 | Westerman et al. | |
| 6,597,345 B2 | 7/2003 | Hirshberg | |
| 6,677,932 B1 | 1/2004 | Westerman | |
| 7,170,430 B2 * | 1/2007 | Goodgoll | 341/26 |
| 7,352,365 B2 | 4/2008 | Trachte | |
| 7,378,991 B2 * | 5/2008 | Dietz et al. | 341/22 |
| 7,614,008 B2 * | 11/2009 | Ording | 715/773 |
| 7,973,770 B2 * | 7/2011 | Tokkonen | 345/173 |

(Continued)

FOREIGN PATENT DOCUMENTS

EP 1383034 1/2004

OTHER PUBLICATIONS

International Search Report and Written Opinion issued by the Netherlands Patent Office dated Jan. 28, 2013 for related Patent Application No. NL2007907.

(Continued)

*Primary Examiner* — Rodney Amadiz
(74) *Attorney, Agent, or Firm* — Shumaker & Sieffert, P.A.

(57) ABSTRACT

A system, method and computer-readable medium for using a touch-screen keyboard. A keyboard operation module generates geometric shapes for display on a touch-screen display, each geometric shape corresponding to a respective finger of a user. Each geometric shape includes characters at predefined locations around the perimeter of the geometric shape. The keyboard operation module detects a sliding movement of a finger in contact with the touch-screen display from inside a geometric shape and toward the perimeter of the geometric shape. The keyboard operation module then determines that the sliding movement is in the direction of a particular character positioned around the perimeter of the geometric shape and selects the particular character for display in a text entry area of the touch-screen display.

20 Claims, 11 Drawing Sheets

(56) References Cited

U.S. PATENT DOCUMENTS

| | | | |
|---|---|---|---|
| 2003/0025616 A1* | 2/2003 | Bickerton | 341/22 |
| 2003/0064736 A1* | 4/2003 | Bickerton et al. | 455/466 |
| 2004/0021633 A1* | 2/2004 | Rajkowski | 345/156 |
| 2005/0024344 A1* | 2/2005 | Trachte | 345/173 |
| 2005/0122313 A1* | 6/2005 | Ashby | 345/168 |
| 2006/0007178 A1* | 1/2006 | Davis | 345/173 |
| 2007/0100523 A1* | 5/2007 | Trachte | 701/41 |
| 2007/0152980 A1* | 7/2007 | Kocienda et al. | 345/173 |
| 2007/0216659 A1* | 9/2007 | Amineh | 345/173 |
| 2007/0252818 A1* | 11/2007 | Zlotnicki | 345/169 |
| 2008/0252603 A1* | 10/2008 | Dietz et al. | 345/169 |
| 2009/0146957 A1* | 6/2009 | Lee et al. | 345/168 |
| 2009/0153487 A1* | 6/2009 | Gunther et al. | 345/168 |
| 2009/0160792 A1* | 6/2009 | Morohoshi et al. | 345/173 |
| 2009/0237359 A1* | 9/2009 | Kim et al. | 345/168 |
| 2009/0237361 A1* | 9/2009 | Mosby et al. | 345/173 |
| 2010/0020020 A1* | 1/2010 | Chen | 345/173 |
| 2010/0103103 A1* | 4/2010 | Palanker et al. | 345/158 |
| 2010/0156793 A1* | 6/2010 | Ozias et al. | 345/168 |
| 2010/0207887 A1* | 8/2010 | Jepsen | 345/168 |
| 2010/0225592 A1* | 9/2010 | Jo | 345/171 |
| 2010/0289764 A1* | 11/2010 | Akabe et al. | 345/173 |
| 2010/0333011 A1* | 12/2010 | Kornev et al. | 715/773 |
| 2011/0010622 A1* | 1/2011 | Fong | 715/702 |
| 2011/0037775 A1 | 2/2011 | Park et al. | |
| 2011/0102335 A1* | 5/2011 | Miyamura et al. | 345/173 |
| 2011/0128235 A1* | 6/2011 | Rogers et al. | 345/173 |
| 2011/0134140 A1* | 6/2011 | Kang | 345/619 |
| 2011/0316791 A1 | 12/2011 | Jiang | |
| 2012/0189368 A1* | 7/2012 | Jawerth et al. | 400/489 |
| 2012/0306767 A1* | 12/2012 | Campbell | 345/173 |
| 2012/0311476 A1* | 12/2012 | Campbell | 715/773 |

OTHER PUBLICATIONS

Office Action from U.S. Appl. No. 13/177,234, dated Aug. 14, 2013, 12 pp.

Response to Office Action dated Aug. 14, 2013, from U.S. Appl. No. 13/177,234, filed Nov. 14, 2013, 10 pp.

* cited by examiner

US 8,754,864 B2

TOUCH-SCREEN KEYBOARD FACILITATING TOUCH TYPING WITH MINIMAL FINGER MOVEMENT

This application is a continuation of U.S. patent application Ser. No. 13/177,234, filed Jul. 6, 2011, which is incorporated by reference herein in its entirety.

BACKGROUND

The emergence of touch-screen devices such as touch-screen personal computers, computer tablets, and mobile devices create a need for fast and efficient data entry keyboards on a touch-screen display. Because of factors, such as the size of the touch-screen devices, the inability of a user to feel the location of the keys on the touch-screen display, or the size of a representation of the conventional keyboard, using a representation of a conventional keyboard on a touch-screen display is not the optimal method for entering data. For example, typing on a touch-screen representation of a conventional keyboard may be too slow. At the same time, switching to a more efficient type of a touch-screen keyboard may require too much learning time from a user to justify a switch.

BRIEF SUMMARY

A system, method and computer-readable medium for using a touch-screen keyboard. A keyboard operation module generates geometric shapes for display on a touch-screen display, each geometric shape corresponding to a respective finger of a user. Each geometric shape includes characters at predefined locations around the perimeter of the geometric shape. The keyboard operation module detects a sliding movement of a finger in contact with the touch-screen display from inside a geometric shape and toward the perimeter of the geometric shape. The keyboard operation module then determines that the sliding movement is in the direction of a particular character positioned around the perimeter of the geometric shape and selects the particular character for display in a text entry area of the touch-screen display.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1A:
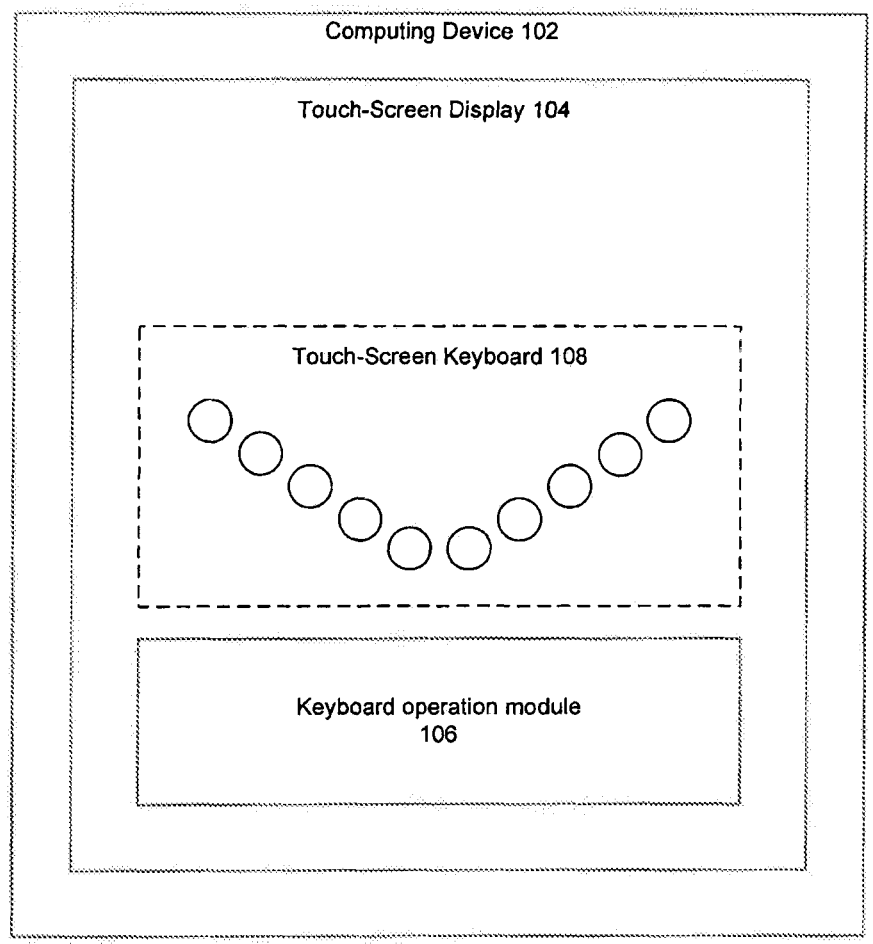
FIG. 1A is a block diagram of a touch-screen device that includes a touch-screen keyboard, according to an embodiment.

The invention will now be described with reference to the accompanying drawings. In the drawings, generally, like reference numbers indicate identical or functionally similar elements. Additionally, generally, the left-most digit(s) of a reference number identifies the drawing in which the reference number first appeals.

DETAILED DESCRIPTION OF THE INVENTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

FIG. 1A is a block diagram 100 of a computing device system that includes a touch-screen keyboard. Block diagram 100 includes a computing device 102, a touch-screen display 104, a keyboard operation module 106 and a touch-screen keyboard 108.

Computing device 102 is an electronic device under the control of a user. Computing device 102 is capable of requesting and receiving resources that include HTML pages over a network, such as the Internet or the World Wide Web, or creating and manipulating content in a standalone environment.

Computing device 102 includes a touch-screen display 104 for viewing and manipulating content. In one embodiment, touch-screen display 104 is a display screen of a computing device 102. In another embodiment, touch-screen display 104 may be coupled to computing device 102 and may communicate with computing device 102 through a communication interface (not shown). Example computing devices 102 are touch-screen personal computers, touch-screen mobile communication devices and tablet computers, to name only a few.

Touch-screen display 104 is an electronic visual display that detects the presence and the location of a touch of a user or a stylus within the touch-screen display area. For example, touch-screen display 104 allows a user to use fingers, a hand or a stylus to enter data such as characters, words and phrases.

Keyboard operation module 106 generates a touch-screen keyboard 108 for a user on touch-screen display 104. In one embodiment, a keyboard operation module 106 is activated when a user places a hand, some or all fingers on the surface of touch-screen display 104. In another embodiment, the user may activate keyboard generation module 106 by pressing a designated area on touch-screen display 104 or computing device 102, such as, without limitation, a top corner of touch-screen display 104, a keyboard button that keyboard operation module 106 displays on touch-screen display 104, etc. In another embodiment, a user may tap on a touch-screen display 104 a configurable number of times to display touch-screen keyboard 108, or tap over a text box area on touch-screen display 104. When activated, keyboard operation module 106 generates geometric shapes that a user may use to enter data.

Unlike conventional touch-screen computing devices that display an image of a conventional keyboard to enter data, keyboard operation module 106 displays geometric shapes to enter characters on touch-screen display 104. Each geometric shape is a data entry area on touch-screen display 104 that is associated with a set of characters that corresponds to characters included on a conventional keyboard. Keyboard operation module 106 may also configure a geometric shape to display a word or a phrase.

Together, the geometric shapes represent a touch-screen keyboard 108 (described in detail below) that a user uses to enter data on touch-screen display 104.

The geometric shapes may include, without limitation, circles, ovals, squares, pentagons, etc., or other geometric shapes configured by a user. Keyboard operation module 106 may initialize the size of each geometric shape to a default size or may vary or adjust the size of each geometric shape based on the size of the fingers of a user. For example, the size of each geometric shape may be proportional to an area on touch screen display 104 that a user touches to enter characters using touch-screen keyboard 108.

A user may also use key board operation module 106 to configure the size of each geometric shape.

Unlike a conventional touch-screen keyboard that simulates a conventional keyboard on a touch-screen device, touch-screen keyboard 108 simulates the placement of the fingers of a user on touch-screen display 104. For example, geometric shapes included in touch-screen keyboard 108 may be positioned on touch-screen display 104 around the centers of the fingertips of the user. In one embodiment, there are as many geometric shapes as there are fingers on a hand of a user. In another embodiment, a user may configure keyboard operation module 106 to display additional geometric shapes.

Figure 1B:
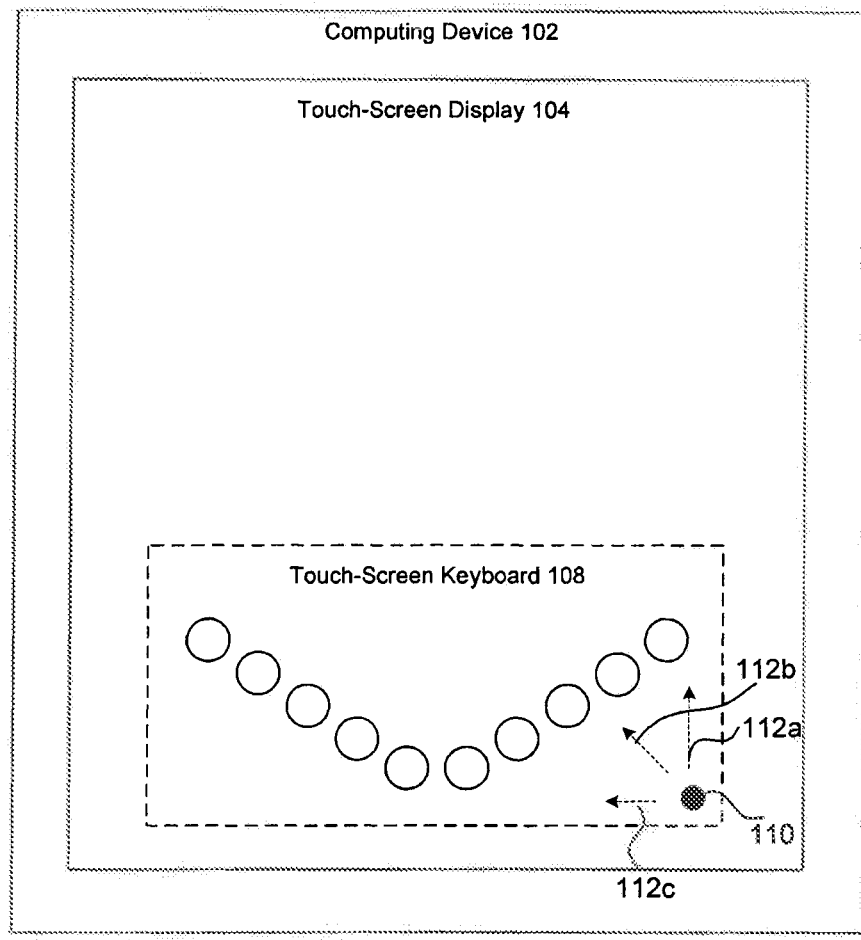
FIG. 1B is a block diagram of a touch-screen keyboard that may be moved on a touch-screen display, according to an embodiment.

Unlike a conventional touch-screen keyboard a computing device displays on the top or bottom portion of a conventional touch-screen display, keyboard operation module 106 may place the geometric shapes in touch-screen keyboard 108 at a location that is desired by a user. For example, a user may drag touch-screen keyboard 108 to a desired location on touch-screen display 104. In one embodiment, as in FIG. 1B, a user may touch a designated area, such as area 110 and drag area 110 to a desired location on touch-screen display 104. For example, to move touch-screen keyboard 108 in a vertical direction, a user can place a finger in area 110 and drag the finger along the surface of touch-screen display 104 in the direction of an arrow 112a. To move touch-screen keyboard 108 in a horizontal direction, a user can place a finger in area 110 and drag the finger along the surface of touch-screen display 104 in the direction of an arrow 112c. To move touch-screen keyboard 108 at an angle, such as, for example, 135 degrees, a user can place a finger in area 110 and drag the finger along the surface of touch-screen display 104 in the direction of an arrow 112b.

Figure 1C:
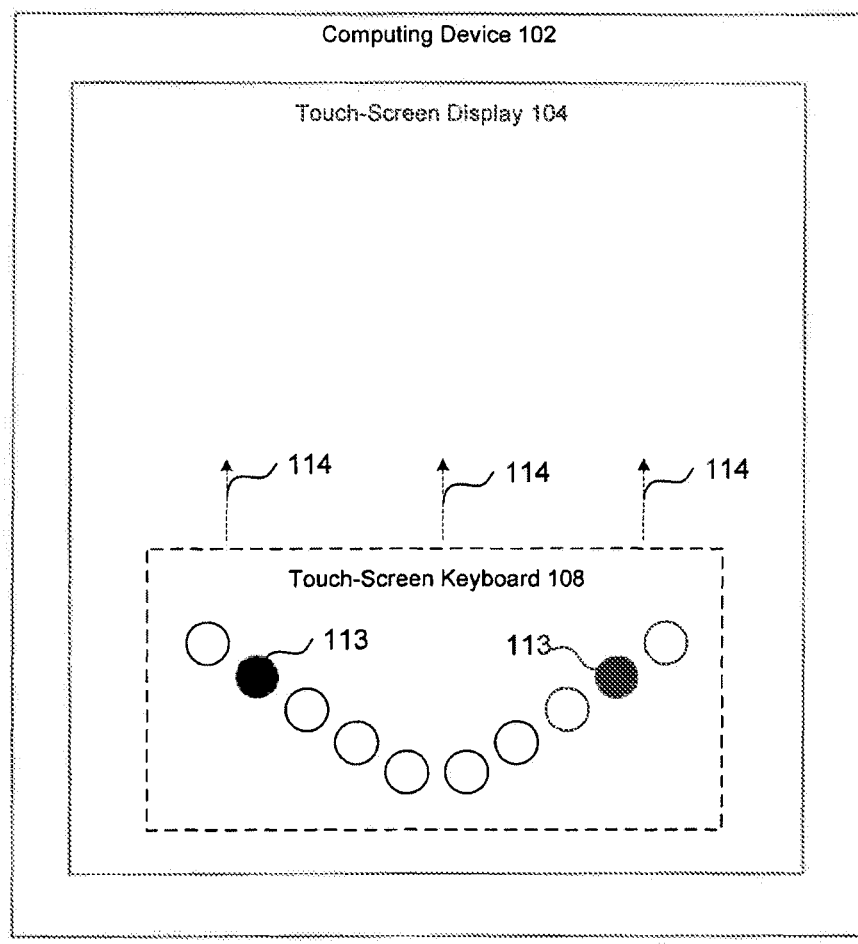
FIG. 1C is another block diagram of a touch-screen keyboard that may be moved on a touch-screen display, according to an embodiment.

In another embodiment, as in FIG. 1C, a user may drag the geometric shapes to a desired location by placing some or all fingertips on top of touch-screen display 104 and over the geometric shapes. For example, a user may place the fingertips of one or both hands on geometric shapes 113, and while maintaining the pressure, slide the fingertips to a desired location for touch-screen keyboard 108 on touch-screen display 104. For example, the user may move touch-screen keyboard 108 vertically, by sliding the fingertips along touch-screen display 104 in the direction of arrows 114.

Once displayed, touch-screen keyboard 108 is locked for use on touch-screen display 104 until a user completes entering data. When touch-screen keyboard 108 is locked for use, touch-screen keyboard 108 remains on touch-screen display until a user completes providing inputs to touch-screen keyboard 108. For example, keyboard operation module 106 may be configured to display touch-screen keyboard 108 on touch-screen display 104 for a predetermined amount of time after a user completes entering data. The predetermined amount of time may be set by a user in keyboard operation module 106. Keyboard operation module 106 may then measure time from the time the user completes touching some or all geometric shapes on touch-screen display 104.

In another example, a user may turn off touch-screen keyboard by touching a predefined area on touch-screen display 104, such as a keyboard menu provided by keyboard operation module 106. In another example, touch-screen keyboard 108 may disappear when a user moves the cursor away from a data entry area displayed on touch-screen display 104, such as, for example, an entry box. A person skilled in the art will appreciate that the examples above are given by way of example, and not limitation, and that other ways to determine when a user completes using touch-screen keyboard 108 may be used.

Figure 2A:
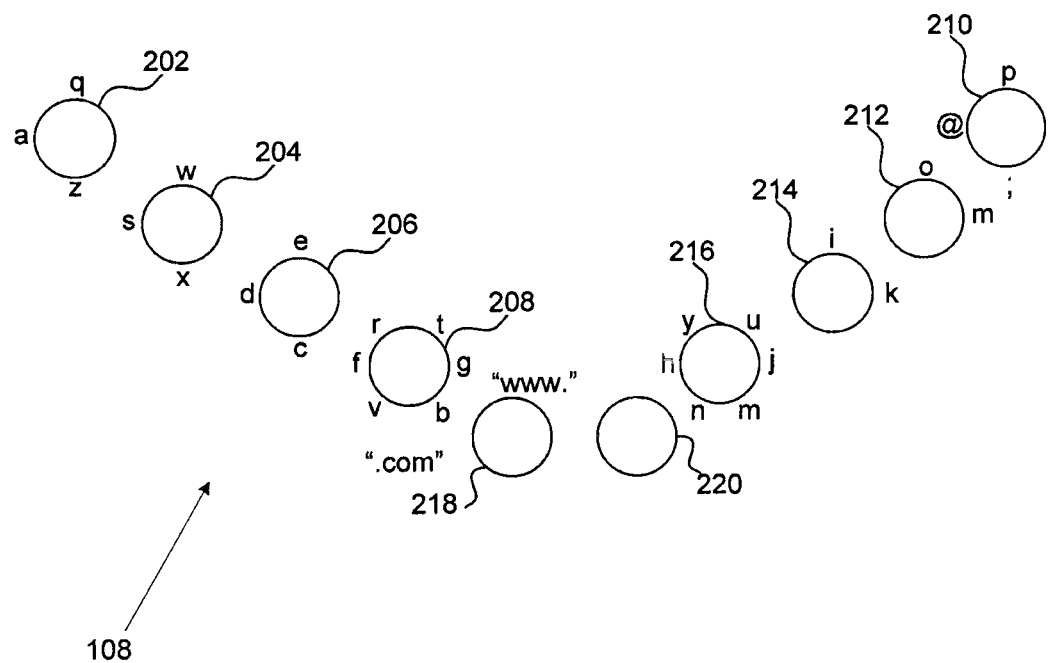
FIG. 2A is a diagram of a touch-screen keyboard, according to an embodiment.

FIG. 2A is an exemplary embodiment 200A of a touch-screen keyboard. In an exemplary embodiment, keyboard operation module 106 generates circles as geometric shapes that represent touch-screen data entry keys. A person skilled in the art will appreciate that keyboard operation module 106 may be configured to generate other geometric shapes that represent touch-screen keyboard 108. In another embodiment, a user may draw the desired geometric shapes using drawing software, and configure keyboard operation module 106 to use the drawn geometric shapes as the desired geometric shapes for touch-screen keyboard 108.

Each circle, such as circles 202-220 represents an area on touch-screen display 104 for entering characters using a particular finger of a user. Each circle of circles 202-220 may also be associated with a predefined set of characters. According to one embodiment, the predefined characters are along the outside boarder of perimeter associated with each circle 202-220. When a user desires to move circles 202-220 to a particular location on touch-screen display 104, the set of characters associated with each circle 202-220 also moves to the desired location.

In an embodiment, a predefined set of characters for each geometric shape may include characters that a user associates with a particular finger on a QWERTY keyboard. In such a way, touch-screen keyboard 108 is flexible in positioning the characters on touch-screen display 104 in a location that is convenient for a user, while maintaining the association of a user with a layout of a conventional QWERTY keyboard. The embodiments of the invention, however, are not limited to an implementation using a QWERTY keyboard.

In another embodiment, a user may configure touch-screen keyboard 108 to include characters in each geometric shape that are associated with a Dvorak keyboard. In another embodiment, a user may configure touch-screen keyboard 108 to include keyboard variations specific to foreign languages, including but not limited to Chinese, Japanese, Arabic and Hebrew.

The following description refers to a non-limiting example of a layout of touch-screen keyboard 108 that includes circles 202-220 in a QWERTY representation. For example, circle 202 may represent a pinky of a left hand. On a QWERTY keyboard the user associates the pinky of a left hand to type characters "a", "q" and "z". On touch-screen display 104, characters "a", "q", and "z" are on the outside perimeter of circle 202.

Circle 204 may represent the ring finger of a left hand. On a QWERTY keyboard the user associates the ring finger of a left hand to type characters "s", "w" and "x". On touch-screen display 104, characters "s", "w" and "x" are on the outside perimeter of circle 204.

Circle 206 may represent the middle finger of a left hand. On a QWERTY keyboard the user associates the middle finger of a left hand to type characters "d", "e" and "c". On touch-screen display 104, characters "d", "e" and "c" are on the outside perimeter of circle 206.

Circle 208 may represent the index finger of a left hand. On a QWERTY keyboard the user associates the index finger of a left hand to type characters "f", "r" "t", "g", "b" and "v". On touch-screen display 104, characters "f", "r", "t", "g", "b" and "v" are on the outside perimeter of circle 208.

Circle 210 may represent the pinky of a right hand. On a QWERTY keyboard the user associates the pinky of a right hand to type characters "p" and ";". In an embodiment, a special character that is frequently used on a computing device 102, such as "@" may also be associated with circle 210, although a user may configure keyboard operation module 106 to display a different character. On touch-screen display 104, characters "p", ";" and "@" are on the outside perimeter of circle 210.

Circle 212 may represent the ring finger of a right hand. On a QWERTY keyboard the user associates the ring finger of a right hand to type characters "i", "o" and "m". On touch-screen display 104, characters "i", "o" and "m" are on the outside perimeter of circle 212.

Circle 214 may represent the middle finger of a right hand. On a QWERTY keyboard the user associates the middle finger of a right hand to type characters "k", "i" and ",". On touch-screen display 104, characters "k", "i" and "," are on the outside perimeter of circle 214.

Circle 216 may represent the index finger of a right hand On a QWERTY keyboard the user associates the index finger of a right hand to type characters "h", "y", "u", "n" and "j". On touch-screen display 104, characters "h", "y", "u", "n" and "j" are on the outside perimeter of circle 216.

In another example, circle 218 represents a thumb of the left hand and circle 220 represents the thumb of a right hand. Those circles may be associated with special characters, phrases or space key or an enter key. Some example special characters or phrases are ".com" or "www.". On touch-screen display 104, characters ".com" and "www." are on the outside perimeter of circles 218 or 220. A user may use keyboard operation module 206 to configure circles 218 and 220 with other special characters, phrases that are desired by a user.

Figure 2B:
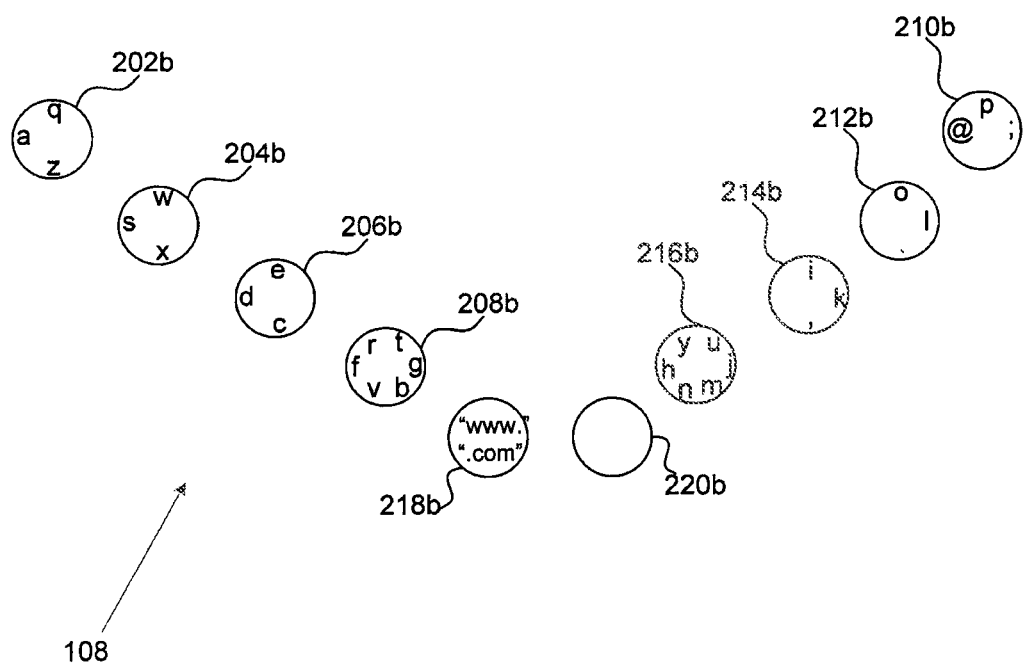
FIG. 2B is another diagram of a touch-screen keyboard, according to an embodiment.

FIG. 2B is exemplary embodiment 200B of a touch-screen keyboard. In this embodiment, characters associated with each geometric shape 202b to 220b may be included inside the perimeter of each geometric shape. For example, characters associated with geometric shape 202b may include characters "a", "q" and "z" that are inside the perimeter of geometric shape 202b.

Figure 2C:
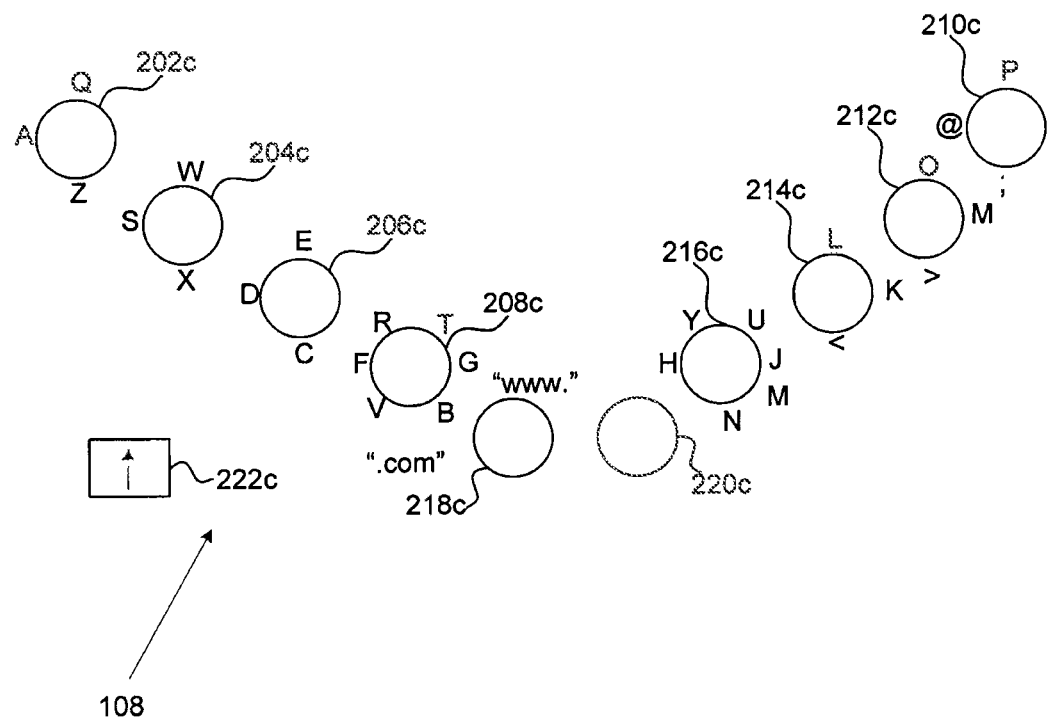
FIG. 2C is another diagram of a touch-screen keyboard that includes an upper case configuration, according to an embodiment.

FIG. 2C discloses an exemplary embodiment 200C that enables a user to capitalize characters in a touch-screen keyboard. Embodiment 200C includes geometric shapes 202c-220c that display capital letters. For example, touch-screen keyboard 108 may include geometric shape 222c that allows a user to switch between an upper case notation of embodiment 200C and lower case notation disclosed in embodiment 200A. Geometric shape 222c allows a user to switch between lower and upper case characters. For example, a user may tap on geometric shape 222c briefly, when a user wishes to type a single character in an upper case notation. In another example, when a user wishes to switch to upper case notation, a user may apply pressure to geometric shape 222c for a configurable amount of time. Similarly, when a user wishes to switch from the upper case notation of embodiment 200C to a lower case notation of embodiment 200A, a user may also apply pressure to geometric shape 222c for a configurable amount of time.

In an embodiment, an upper case notation associated with geometric shape 222c may be included in geometric shapes 202c-220c. For example, an upper case notation may be included in geometric shape 202c between characters "A" and "Z". In this embodiment, a user may switch to an upper case notation by sliding a pinky of a left hand toward the upper case notation included in geometric shape 202c.

Figure 2D:
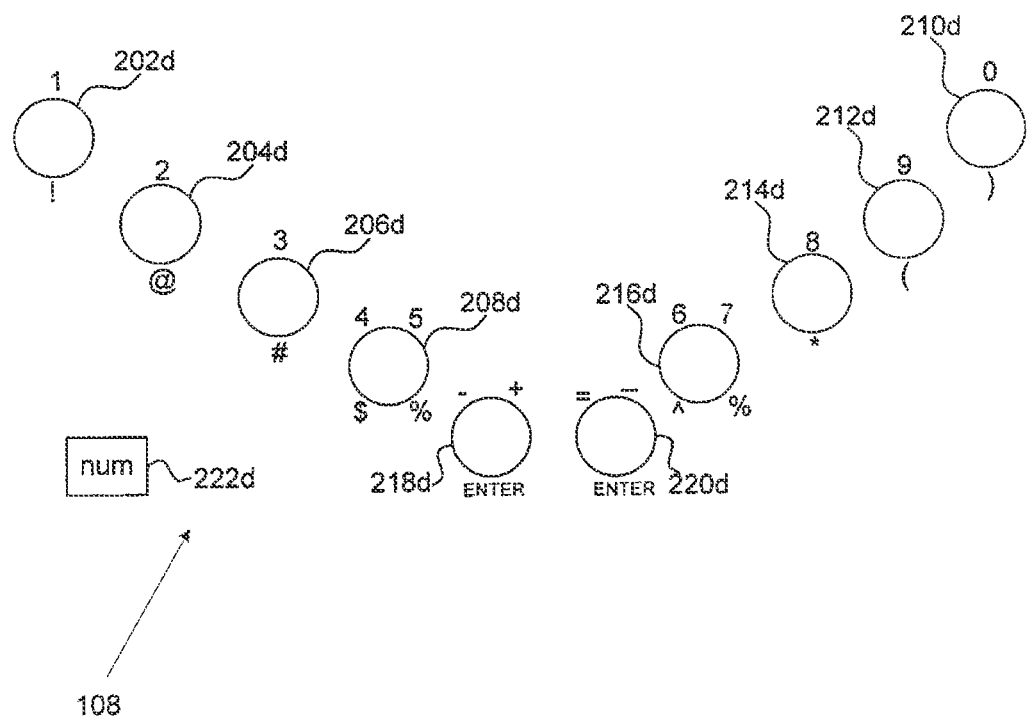
FIG. 2D is another diagram of a touch-screen keyboard that includes a numeric configuration, according to an embodiment.

FIG. 2D discloses an exemplary embodiment 200D that enables a touch-screen display to displays numbers and special characters. Embodiment 200D includes geometric shapes 202d-220d that display numbers and special characters. For example, touch-screen keyboard 108 may include geometric shape 222d that allow a user to switch between a numeric layout described in embodiment 200D and an alphabetic layout described in embodiment 200.

Touch-screen keyboard 108 displaying a numeric layout may also display special characters, such as, without limitations characters that share the same key with the numerical characters on a QWERTY keyboard. In another embodiment, however, touch-screen keyboard 108 may be configured to display special characters separately from the numeric characters.

In an exemplary embodiment, circles 202d-220d describe the numeric layout included in touch-screen keyboard 108 and corresponding special characters as displayed on a QWERTY keyboard. For example, circle 202d may be associated with characters "1" and "!".

Circle 204d may be associated with characters "2" and "@".

Circle 206d may be associated with characters "3" and "#".

Circle 208d may be associated with characters "4", "5", "%" and "$".

Circle 210d may be associated with characters "0" and ")".

Circle 212d may be associated with characters "9" and "(".

Circle 214d may be associated with characters "8" and "*".

Circle 216d may be associated with characters "6", "7", "^" and "&".

Circle 218d may be associated with characters "−" and "+" or "ENTER".

Circle 220d may be associated with characters "_" AND "=" or "ENTER".

A person skilled in the art will appreciate that this embodiment is not limiting and that a user may configure geometric shapes to display the numerical and special characters as desired by a user.

In an embodiment, a user may also configure for multiple geometric shapes to be associated with the same character(s).

Figure 2E:
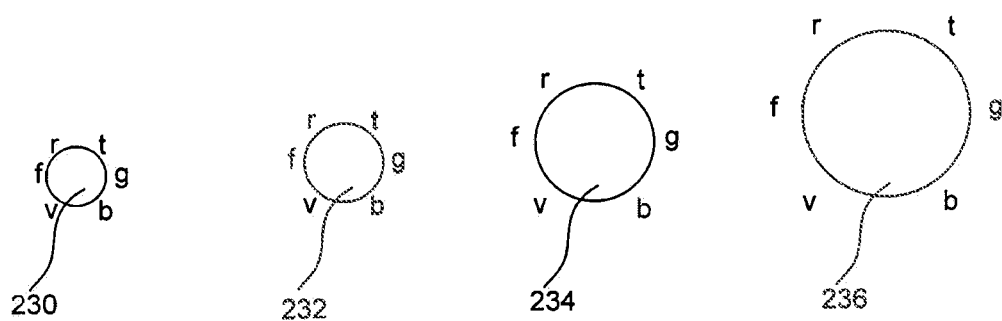
FIG. 2E is a diagram of a touch-screen keys of various sizes, according to an embodiment.

FIG. 2E discloses an exemplary embodiment 200E of different sizes for geometric shapes. Geometric shapes included in touch-screen keyboard 108 may adjust to the size of a finger of a user. In an embodiment, keyboard operation module 106 determines the size of each geometric shape based on the size of an area on touch-screen display 104 that receives pressure from the fingers of a user, when the user activates touch-screen keyboard 108. In another embodiment, keyboard operation module 106 may adjust the size of each geometric shape associated with touch-screen keyboard as the keyboard operation module 106 receives input from the user.

Embodiment 200E displays geometric shapes as circles 230-236 of various sizes. Example geometric shapes include circles 230-236 of various sizes that include characters "f", "r", "t", "g", "v" and "b". For example, circle 230 may be generated by a user having a smaller finger size than circle 236.

A user uses touch-screen keyboard 108 to enter characters and data onto an area in touch-screen display 104 that receives input. A user may place his finger inside the geometric shape that is associated with a particular finger. For example, a user may position the pinky of the left hand inside circle 202, the ring finger of the left hand inside circle 204, etc.

Figure 2F:
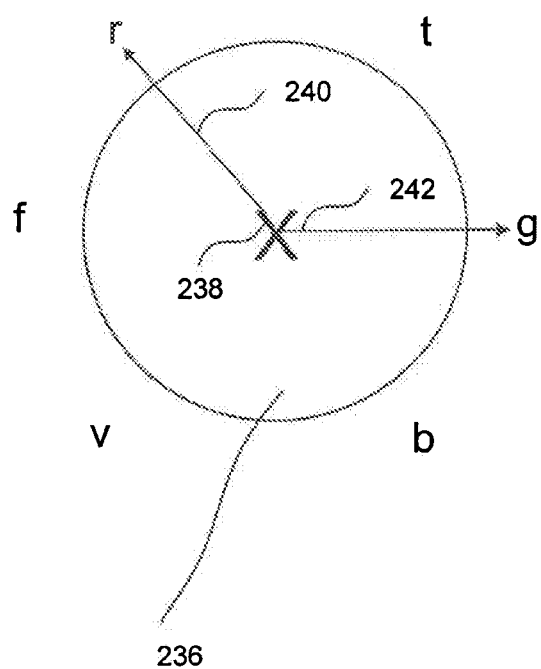
FIG. 2F is a diagram for selecting a character on a touch-screen key, according to an embodiment.

Once a user positions his fingers inside the associated geometric shape, a user causes keyboard operation module 106 to generate a character by sliding his fingers from the center of the geometric shape and in the direction of the desired character. FIG. 2F is an exemplary embodiment 200F of a user using a geometric shape to select a character. Embodiment 200F allows a user to simulate entering data using a format, for example, of a QWERTY keyboard, but using geometric shapes.

Embodiment 200F includes an exemplary geometric shape, such as, circle 236 described above. In an embodiment, circle 236 may correspond to an index finger of a left hand of a user. To type a character using circle 236, a user places his finger, such as, an index finger of a left hand in the center of circle 236 at position 238. A user causes keyboard operation module 106 to type a character on touch-screen display 104 by sliding a finger from position 238 and in the direction of the desired character. For example, a user may cause keyboard operation module 106 to type character "r" by sliding the index finger of the left hand from position 238 and upward toward character "r", as described by arrow 240 in embodiment 200F. Similarly, a user may type character "g" by sliding the index finger of the left hand from position 238 in the center of circle 236 and in the direction of character "g", as described by arrow 242. A person skilled in the art will appreciate that a user may use a similar movement of a left index finger to type characters "r" and "g" on a conventional keyboard.

Keyboard operation module 106 detects the movement of a user on touch-screen display 104 by determining the starting and ending position of a finger of a user on touch-screen display 104. When keyboard operation module 106 determines that a user moved a finger from the inside of geometric shape toward a character, keyboard operation module 106 identifies the character and displays the character on touch-screen display 104. For example, keyboard operation module 106 stores a location of each geometric shape that is displayed on touch-screen display 104. The location of each geometric shape may be stored as a set of (x,y) coordinates, that correspond to the grid of touch-screen display 104. The characters that are associated with each geometric shape also include their own area on touch-screen display 104. The location of each character that is associated with a geometric shape may also be stored as a set of (x,y) coordinates. A person skilled in the art will appreciate that keyboard operation module 106 recalculates the (x,y) coordinates for each geometric shape and the associated characters each time a user decides to move touch-screen keyboard 108 to a new location on touch-screen display 104.

When a user touches touch-screen display 104, a user applies pressure to a particular area of touch-screen display 104. Keyboard operation module 106 identifies the (x,y) coordinates of the area on touch-screen display 104 that receives pressure from a user. Keyboard operation module 106 then proceeds to map the (x,y) coordinates of an area that a user touches on touch-screen display 104 to the (x,y) coordinates of a geometric shape. For example, when a user places a finger on position 238, keyboard operation module 106 determines that the (x,y) coordinates of the area on touch-screen display 104 where the user applies pressure, overlap with the (x,y) coordinates of the geometric shape.

As a user slides a finger from position 238 to a character associated with geometric shape 236, keyboard operation module 106 determines the direction in which a user slides a finger. For example, keyboard operation module 106 tracks the (x,y) coordinates of the area on touch-screen display where a user applies pressure as he slides the finger. Keyboard operation module 106 also determines whether the user applied pressure on an area of touch-screen display 104 that overlaps with a set of (x,y) coordinates for a particular character. If the overlap occurs, keyboard operation module 106 determines that the character is associated with a geometric shape and displays the character in a text area on touch-screen display 104.

Figure 3:
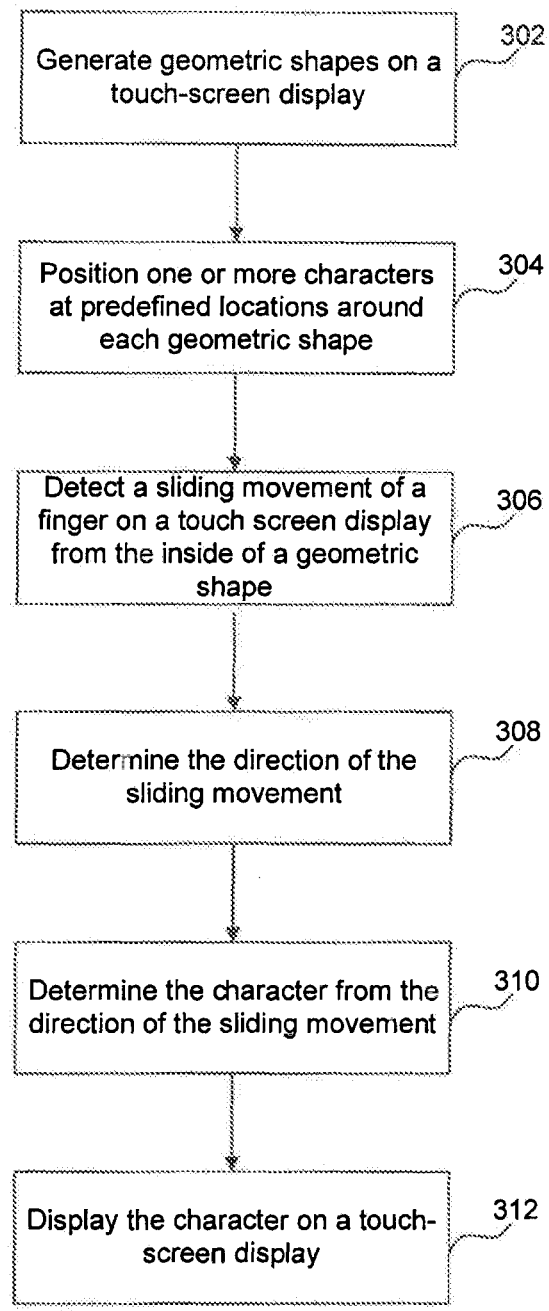
FIG. 3 is a flowchart of a method for using a touch-screen keyboard on a touch-screen device, according to an embodiment.

FIG. 3 is a flowchart for a method 300 for receiving input with a touch-screen keyboard, according to an embodiment.

At stage 302, geometric shapes are generated. For example, keyboard operation module 106 generates geometric shapes in response to a user placing fingers of one or both hands on touch-screen display 104. As described herein, each geometric shape displayed on touch-screen display 104 corresponds to a particular finger of a user.

At stage 304, characters associated with each geometric shape are displayed. For example, keyboard operation module 106 displays one or more characters associated with each geometric shape. As described herein, characters associated with each geometric shape may be associated with a QWERTY or DVORAK characters that a user types with a corresponding finger. Alternatively a user may configure a preferred set the characters for each geometric shape.

At stage 306, a sliding movement of a finger is detected. For example, keyboard operation module 106 detects a user sliding a finger from a center of a particular geometric shape and towards the perimeter of the geometric shape on touch-screen display 104.

At stage 308, a direction of the sliding movement is determined. For example, keyboard operation module 106 determines the direction of a siding movement of a finger. As described herein, the direction of the sliding movement is toward a particular character that is associated with a particular position around the perimeter of the particular geometric shape.

At stage 310, a character is identified. For example, when a user completes the sliding movement, keyboard operation module 106 determines whether the position of a finger of a user overlaps with a character that is associated with the geometric shape.

At stage 312, a character is displayed. For example, if keyboard operation module 106 determines an overlap, keyboard operation module 106 displays the character in a text area on touch-screen display 104.

Figure 4:
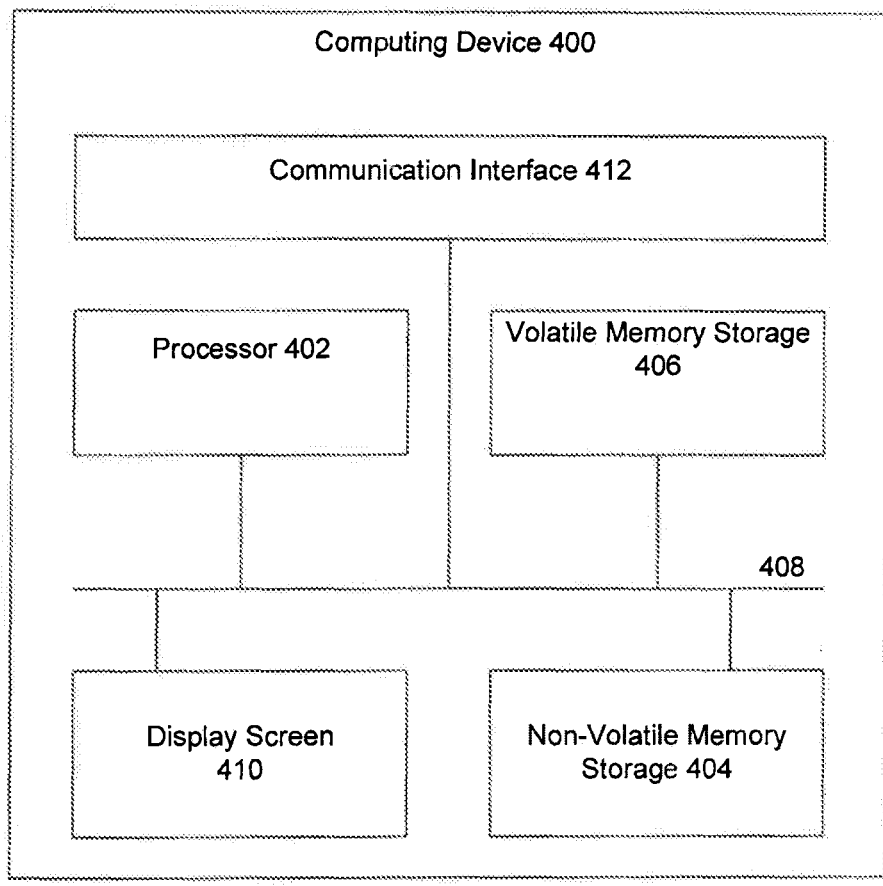
FIG. 4 is a block diagram of a computer system in which embodiments of the invention can be implemented.

FIG. 4 is an example computer system 400 in which embodiments of the present invention, or portions thereof, may be implemented as computer-readable code. For example, the components or modules of system 100, including keyboard operation module 106 may be implemented in one or more computer systems 400 using hardware, software, firmware, tangible computer-readable media having instructions stored thereon, or a combination thereof and may be implemented in one or more computer systems or other processing systems. Modules and components in FIGS. 1-3 may be embodied in hardware, software, or any combination thereof.

Computing device 102 may include one or more processors 402, one or more non-volatile storage mediums 404, and one or more memory devices 406, a communication infrastructure 408, a display screen 410 and a communication interface 412. Processors 402 may include any conventional or special purpose processor, including, but not limited to, digital signal processor (DSP), field programmable gate array (FPGA), and application specific integrated circuit (ASIC). Non-volatile storage 404 may include one or more of a hard disk drive, flash memory, and like devices that may store computer program instructions and data on computer-readable media. One or more of non-volatile storage device 404 may be a removable storage device. Memory devices 406 may include one or more volatile memory devices such as but not limited to, random access memory. Communication infrastructure 408 may include one or more device interconnection buses such as Ethernet, Peripheral Component Interconnect (PCI), and the like.

Typically, computer instructions are executed using one or more processors 402 and can be stored in non-volatile storage medium 404 or memory devices 406.

Display screen 410 allows results of the computer operations to be displayed to a user or an application developer.

Communication interface 412 allows software and data to be transferred between computer system 400 and external devices. Communication interface 412 may include a modem, a network interface (such as an Ethernet card), a communications port, a PCMCIA slot and card, or the like. Software and data transferred via communication interface 412 may be in the form of signals, which may be electronic, electromagnetic, optical, or other signals capable of being received by communication interface 412. These signals may be provided to communication interface 412 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method comprising:
outputting a plurality of geometric shapes for display on a touch-screen display, each geometric shape corresponding to a respective finger of a user, wherein respective positions and a number of the plurality of geometric shapes correspond to positions and a number of user fingers in contact with the touch-screen display;
positioning, on the touch-screen display, a plurality of characters at predefined locations outside of and around a perimeter of at least one of the geometric shapes, the plurality of characters associated with the at least one of the geometric shapes, wherein:
each of the plurality of characters is associated with the at least one of the geometric shapes based on at least one of the plurality of characters being displayed in a text area responsive to an indication of a sliding input originating at the at least one of the geometric shapes and in a direction of the at least one of the plurality of characters;
the plurality of characters around the perimeter of each geometric shape are each associated with a particular user finger currently in contact with the touch-screen display,
the plurality of characters are positioned without overlapping any geometric shape such that none of the plurality of characters are included inside any geometric shape, and in a layout of a conventional two-handed keyboard associated with a typing pattern of the particular user finger;
receiving an indication of a sliding movement of a user finger in contact with the touch-screen display from inside a particular one of the geometric shapes to outside the particular geometric shape;
determining that the sliding movement is substantially in a direction of a particular one of the plurality of characters positioned around the perimeter of the particular geometric shape, the particular one of the plurality of characters positioned outside the perimeter of the one of the plurality of geometric shapes; and
selecting the particular character for display in a text entry area of the touch-screen display, wherein the particular character is selected based on the sliding movement.

2. The method of claim 1, wherein each geometric shape corresponding to a respective finger of the user adjusts to a size of the respective finger of the user, wherein the size of the respective finger is determined based on a size of an area on the touch-screen display that receives pressure from the finger.

3. The method of claim 1, wherein each geometric shape is a circle.

4. The method of claim 1, further comprising configuring each geometric shape in the plurality of geometric shapes to a particular shape for display on the touch-screen display.

5. The method of claim 1, wherein the conventional keyboard is a QWERTY keyboard.

6. The method of claim 1, further comprising:
responsive to the sliding movement, determining a new location for each geometric shape on the touch-screen display.

7. The method of claim 1, further comprising centering each geometric shape around one or more user fingers when the one or more user fingers are placed on the touch-screen display.

8. The method of claim 1, further comprising:
positioning a phrase at a predefined location around the perimeter of the particular geometric shape;
determining that the sliding movement is substantially in the direction of the phrase positioned around the perimeter of the particular geometric shape; and
selecting the phrase for display in the text entry area of the touch-screen display, wherein the phrase is selected based on the sliding movement.

9. The method of claim 1, wherein a number of geometric shapes output correspond to a number of user fingers in contact with the touch-screen display and one or more additional geometric shapes.

10. A system comprising:
a touch-screen display configured to output, for display, one or more characters in a text entry area; and
a keyboard operation module configured to:
output a plurality of geometric shapes for display on the touch-screen display, wherein each geometric shape corresponds to a respective finger of a user, wherein respective positions and a number of the plurality of geometric shapes correspond to positions and a number of user fingers in contact with the touch-screen display;
position, on the touch-screen display, a plurality of characters at predefined locations outside of and around a perimeter of at least one of the geometric shapes, the plurality of characters associated with the at least one of the geometric shapes, wherein:
each of the plurality of characters is associated with the at least one of the geometric shapes based on at least one of the plurality of characters being displayed in a text area responsive to an indication of a sliding input originating at the at least one of the geometric shapes and in a direction of the at least one of the plurality of characters;
the plurality of characters around the perimeter of each geometric shape are each associated with a particular user finger currently in contact with the touch-screen display,
the plurality of characters are positioned without overlapping any geometric shape such that none of the plurality of characters are included inside any geometric shape, and in a layout of a conventional two-handed keyboard associated with a typing pattern of the particular user finger;
receive an indication of a sliding movement of a user finger in contact with the touch-screen display from inside a particular one of the geometric shapes to outside the particular geometric shape, the particular one of the plurality of characters positioned outside the perimeter of the one of the plurality of geometric shapes;
determine that the sliding movement is substantially in the direction of a particular one of the plurality of characters positioned around the perimeter of the particular geometric shape; and
select the particular character for display in the text entry area of the touch screen display, wherein the particular character is selected based on the sliding movement.

11. The system of claim 10, wherein the keyboard operation module is further configured to adjust each geometric shape corresponding to a respective finger of the user to a size of the respective finger of the user, wherein the size of the respective finger is determined based on a size of an area on the touch-screen display that receives pressure from the finger.

12. The system of claim 10, wherein the geometric shape is a circle.

13. The system of claim 10, wherein the keyboard operation module is further configured to output a particular shape for each geometric shape in the plurality of geometric shapes for display on the touch-screen display.

14. The system of claim 10, the conventional keyboard is a QWERTY keyboard.

15. The system of claim 10, wherein the keyboard operation module is further configured to:
responsive to the sliding movement, determine a new location for each geometric shape on the touch-screen display.

16. The system of claim 10, wherein the keyboard operation module is further configured to:
position a phrase at a predefined location around the perimeter of the particular geometric shape;
determine that the sliding movement is substantially in the direction of the phrase positioned around the perimeter of the particular geometric shape; and
select the phrase for display in the text entry area of the touch-screen display, wherein the phrase is selected based on the sliding movement.

17. A non-transitory computer-readable medium, having instructions stored thereon, wherein the instructions cause a computing device to perform operations, comprising:
outputting a plurality of geometric shapes for display on a touch-screen display, each geometric shape corresponding to a respective finger of a user, wherein respective positions and a number of the plurality of geometric shapes correspond to positions and a number of user fingers in contact with the touch-screen display;
positioning, on the touch-screen display, a plurality of characters at predefined locations outside of and around a perimeter of at least one of the geometric shapes, the plurality of characters associated with the at least one of the geometric shapes, wherein:
each of the plurality of characters is associated with the at least one of the geometric shapes based on at least one of the plurality of characters being displayed in a text area responsive to an indication of a sliding input originating at the at least one of the geometric shapes and in a direction of the at least one of the plurality of characters;
the plurality of characters around the perimeter of each geometric shape are each associated with a particular user finger currently in contact with the touch-screen display,
the plurality of characters are positioned without overlapping any geometric shape such that none of the plurality of characters are included inside any geometric shape, and in a layout of a conventional two-handed keyboard associated with a typing pattern of the particular user finger;
receiving an indication of a sliding movement of a user finger in contact with the touch-screen display from inside a particular one of the geometric shapes to outside the particular geometric shape;

determining that the sliding movement is substantially in the direction of a particular one of the plurality of characters positioned around the perimeter of the particular geometric shape, the particular one of the plurality of characters positioned outside the perimeter of the one of the plurality of geometric shapes; and selecting the particular character for display in a text entry area of the touch-screen display, wherein the particular character is selected based on the sliding movement.

18. The non-transitory computer-readable medium of claim 17 wherein the conventional keyboard is a QWERTY keyboard.

19. The non-transitory computer-readable medium of claim 17, wherein the instructions that cause the outputting of the plurality of geometric shapes, also cause the computing device to perform operations comprising:

responsive to the indication, determining a new location for each geometric shape on the touch-screen display.

20. The non-transitory computer-readable medium of claim 17, wherein the instructions that cause the outputting of the plurality of geometric shapes, also cause the computing device to perform operations comprising:

positioning a phrase at a predefined location around the perimeter of the particular geometric shape;

determining that the sliding movement is substantially in the direction of the phrase positioned around the perimeter of the particular geometric shape; and selecting the phrase for display in the text entry area of the touch-screen display, wherein the particular character is selected based on the sliding movement.

* * * * *